United States Patent Office.

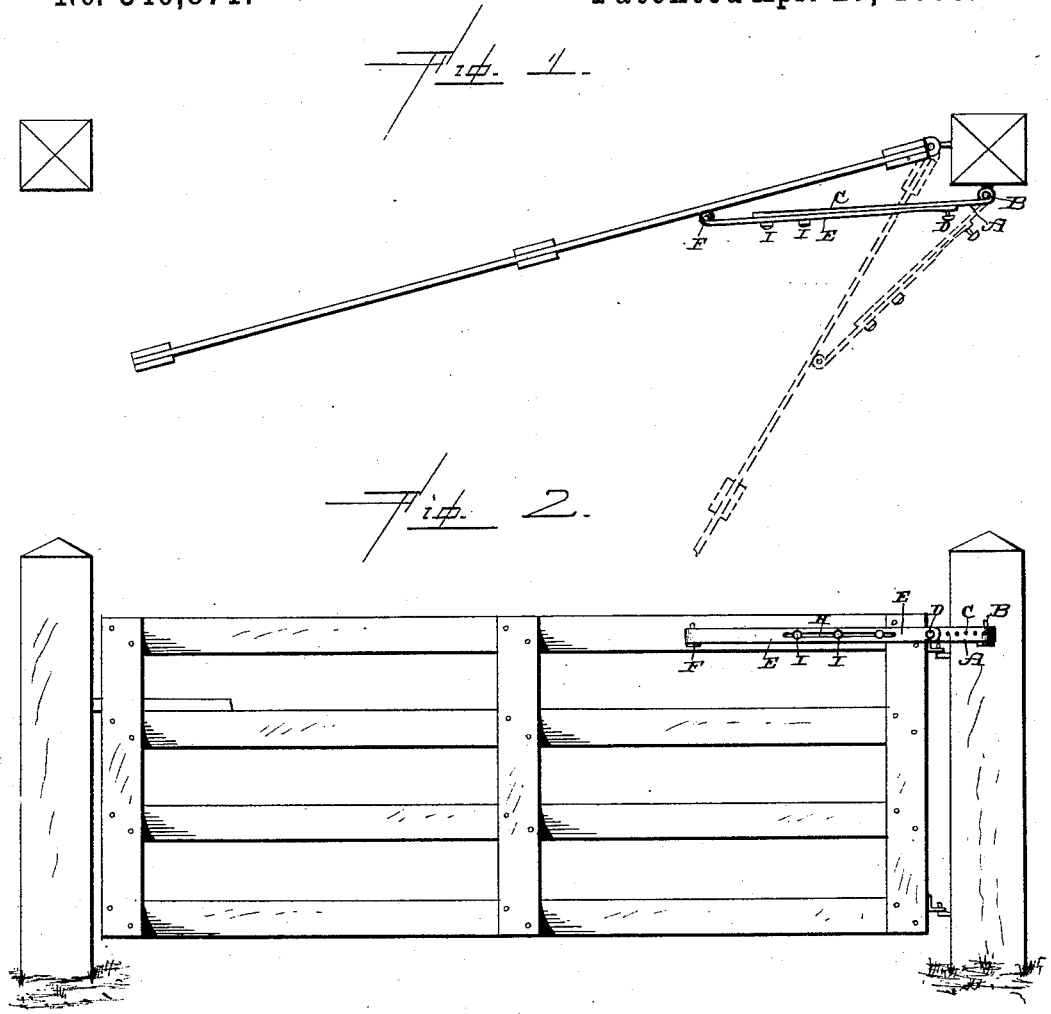

JACOB GLASS, OF HARRISBURG, OHIO, ASSIGNOR OF ONE-HALF TO OWEN T. CURRY, OF SAME PLACE.

CHECK FOR DOORS AND GATES.

SPECIFICATION forming part of Letters Patent No. 340,871, dated April 27, 1886.

Application filed February 25, 1886. Serial No. 193,145. (No model.)

*To all whom it may concern:*

Be it known that I, JACOB GLASS, of Harrisburg, in the county of Franklin and State of Ohio, have invented certain new and useful Improvements in Checks for Doors and Gates; and I do hereby declare the following to be a full, clear, and exact description of the invention, such as will enable others skilled in the art to which it pertains to make and use it, reference being had to the accompanying drawings, which form part of this specification.

My invention relates to an improvement in checks for gates; and it consists in the combination of two rods, one of which is slotted, and the other provided with a series of holes, and which are held in contact with each other by suitable holding devices, the movable rod being provided with a button or catch at one end, so as to snap into the holes in the stationary part, and thus hold the gate open at any desired angle, as will be more fully described hereinafter.

The object of my invention is to provide an attachment for gates, whereby they can be held open at any desired angle, either for the purpose of allowing small stock to pass from field to field, without permitting the larger stock to go through, or to hold a gate wide open where it has a tendency to sag while a vehicle is passing through.

Figure 1 is a plan view of a gate, showing my invention attached therto. Fig. 2 is a side elevation of the same.

A represents the rod, which is pivoted at its inner end upon a hinge, B, and which has no endwise movement. This rod turns freely on its hinge, so as to follow the movements of the gate, but has no other movement. Near the inner end of this rod are formed a series of perforations, C, in which the catch D on the rod E automatically catches, for the purpose of holding the gate at any desired angle. The rod E is pivoted upon a hinge or other suitable device, F, which is secured to the gate, and which rod is provided with a suitable slot, H, of any suitable length, so as to allow this rod to slide freely back and forth upon the rod A. The two rods are connected together by suitable buttons or other holding devices, I, which pass through the slot into the rod A, and which buttons or holding devices also serve to regulate the distance that one rod shall move upon the other. This rod E is made thinner near its inner end, so as to cause it to be more or less elastic, and thus cause the catch to snap freely into one of the holes in the rod A, whenever it is free to move. The inner end of the rod A being connected to a hinge upon the post, and the rod E being connected to a hinge upon the gate, the two rods, as long as the catch is held out of contact with one of the holes, swing freely with the gate without acting as a check upon its movement. As soon, however, as the catch drops into one of the holes in the rod A, all movement of the two rods one upon the other is instantly checked, and then the movement of the gate in either direction is stopped, for the reason that the rods no longer have an endwise movement.

Where it is desired to only partially open the gate, so that small stock can pass from one field to another, and yet not permit large stock to pass through, the gate is opened to the desired extent, and then the catch is made to snap into a corresponding hole in the rod A, and then the gate will be held at that angle, so that it can neither open nor close.

When the gate is opened wide, for the purpose of allowing a vehicle to pass through, the catch is raised out of the hole, and then the gate is swung open to the desired extent. If the gate is inclined to sag, so as to swing shut, the catch is made to snap into that hole in the rod A which will cause the rods to hold the gate wide open.

Very frequently gates are inclined to sag, and where no prop can be found for holding the gate open the driver has difficulty to get his vehicle safely through. By means of the device here shown and described the gate can be locked open at any suitable angle.

Having thus described my invention, I claim—

The combination of the rod A, hinged or pivoted at its inner end and provided with a series of perforations, with the rod E, which is pivoted or hinged upon the gate and provided with a slot and a catch at its inner end, and the holding devices, which pass through the slot and connect the two rods together, substantially as shown and described.

In testimony whereof I affix my signature in presence of two witnesses.

JACOB GLASS.

Witnesses:
CHAS. S. CHEVINGTON,
J. S. GOLD.